US007011262B2

(12) United States Patent
Patterson

(10) Patent No.: US 7,011,262 B2
(45) Date of Patent: Mar. 14, 2006

(54) FISHING BOBBIN

(76) Inventor: David Michael Patterson, P.O. Box 225, Union, KY (US) 41091

(*) Notice: Subject to any disclaimer, the term of this patent is extended or adjusted under 35 U.S.C. 154(b) by 0 days.

(21) Appl. No.: 10/817,075

(22) Filed: Apr. 2, 2004

(65) Prior Publication Data

US 2005/0224618 A1 Oct. 13, 2005

(51) Int. Cl.
*A01K 89/01* (2006.01)

(52) U.S. Cl. ...................... 242/322; 242/310; 242/316; 242/615.4; 43/20; 43/22

(58) Field of Classification Search ........ 242/322–323, 242/310, 316, 223, 615, 615.3, 615.4, 125, 242/613.3; 43/20, 22, 24
See application file for complete search history.

(56) References Cited

U.S. PATENT DOCUMENTS

| | | | | | |
|---|---|---|---|---|---|
| 401,849 | A | | 4/1889 | Paddock | |
| 1,516,522 | A | * | 11/1924 | Farr | 242/322 |
| 1,827,488 | A | | 10/1931 | Roach | |
| 2,575,588 | A | | 11/1951 | Fritts | |
| 2,582,289 | A | | 1/1952 | Smith | |
| 2,659,544 | A | * | 11/1953 | Freeman | 242/322 |
| 2,731,756 | A | * | 1/1956 | Nelson | 242/309 |
| 2,756,944 | A | | 7/1956 | Armstrong | |
| 2,842,322 | A | * | 7/1958 | Bradshaw | 242/322 |
| 3,312,417 | A | * | 4/1967 | Thompson | 242/322 |
| 3,795,072 | A | * | 3/1974 | Sherman | 242/229 |
| 3,831,882 | A | * | 8/1974 | Fitterer et al. | 242/346 |
| 4,151,966 | A | * | 5/1979 | Lindsay | 242/404.2 |
| 4,402,471 | A | | 9/1983 | Normann | |
| 5,427,339 | A | * | 6/1995 | Pauli et al. | 248/75 |
| 6,269,583 | B1 | | 8/2001 | Tashchyan | |
| 6,581,321 | B1 | | 6/2003 | Tashchyan | |
| 2001/0017000 | A1 | | 8/2001 | Tashchyan | |

FOREIGN PATENT DOCUMENTS

| | | | | |
|---|---|---|---|---|
| FR | 2691044 | * | 5/1992 | 242/322 |

* cited by examiner

*Primary Examiner*—Emmanuel M Marcelo
(74) *Attorney, Agent, or Firm*—Frost Brown Todd LLC

(57) ABSTRACT

A fishing reel comprises a bobbin and a bracket. The bobbin comprises first and second ends and an elongate body extending between the first and second ends. The bobbin has a pair of protrusions at each end and a gathering region between each pair of protrusions. The bobbin is configured to wrappingly receive fishing line about the body and between each pair of protrusions. The bracket comprises at least one support member configured to support the bobbin relative a fishing rod. The bracket has a pair of flanges configured to be received by hoods on the fishing rod. The bracket is rigidly attached to the bobbin.

15 Claims, 4 Drawing Sheets

FISHING BOBBIN

BACKGROUND

The present invention relates in general to fishing, and will be described below as a bobbin with a bracket for mounting to a standard fishing rod.

Humans have been fishing since well before recorded history. The styles and techniques for fishing have varied between cultures and times, but some facets of fishing have remained unchanged over the centuries. While fishing remains an important source of nutrition in many cultures, it also offers recreational outlets to thousands of people across the planet. Whether using spears, arrows, nets or rods, fishing has always been, and will continue to be, an important part of human civilization.

One technique of fishing is commonly referred to as "fly fishing". An early reference to fly fishing is in Ælian's Natural History, probably written about 200 A.D. In the seventeen volume *On the Nature of Animals*, Ælian mixes personal observation with fact, legend and fancy drawn from earlier authors, pouncing on passing ideas like a thirsty man upon flagons of ale, with the result that there is little order in the work. His book intentionally lacked structure and it contains frequent errors many of which Ælian could have eliminated with very little effort, not least his belief that goats could breathe through their ears. However, the book is pure entertainment which is why the author saw no reason why he should not discuss elephants in one breath and dragons in the next. We should be glad of this, because in the course of his frantic rush through all of nature Ælian chanced to write these immortal lines:

I have heard of a Macedonian way of catching fish, and it is this: between Borœa and Thessalonica runs a river called the Astræus, and in it there are fish with speckled skins; what the natives of the country call them you had better ask the Macedonians. These fish feed upon a fly peculiar to the country, which hovers on the river. It is not like the flies found elsewhere, nor does it resemble a wasp in appearance, nor in shape would one justly describe it as a midge or a bee, yet it has something of each of these. In boldness it is like a fly, in size you might call it a midge, it imitates the colour of a wasp, and it hums like a bee. The natives generally call it the Hippouros.

These flies seek their food over the river, but do not escape the observation of the fish swimming below. When then the fish observes a fly on the surface, it swims quietly up, afraid to stir the water above, lest it should scare away its prey; then coming up by its shadow, it opens its mouth gently and gulps down the fly, like a wolf carrying off a sheep from the fold or an eagle a goose from the farmyard; having done this it goes below the rippling water.

Now though the fishermen know this, they do not use these flies at all for bait for fish; for if a man's hand touch them, they lose their natural colour, their wings wither, and they become unfit food for the fish. For this reason they have nothing to do with them, hating them for their bad character; but they have planned a snare for the fish, and get the better of them by their fisherman's craft.

They fasten red (crimson red) wool around a hook, and fix onto the wool two feathers which grow under a cock's wattles, and which in colour are like wax. Their rod is six feet long, and their line is the same length. Then they throw their snare, and the fish, attracted and maddened by the colour, comes straight at it, thinking from the pretty sight to gain a dainty mouthful; when, however, it opens its jaws, it is caught by the hook, and enjoys a bitter repast, a captive.

The above quote is taken from Radcliffe's *Fishing from the Earliest Times*, Murray (1921), and with various alterations it is the one most often reprinted, often without any credit. In his text, Radcliffe tells us that he adapted his translation from *Lambert's Angling Literature in England* (1881). Prior to this, a Latin translation was available in Gesner's *Historia Animalium*, printed in 1558, where it lay unread for nearly three centuries until Oliver rediscovered it in 1834.

While the core aspects of fly fishing hearkens back to ancient times, the present invention offers a unique and novel improvement to fly fishing. The invention has particular utility with fly fishing; however, it should be understood that it can also be used with any type of rod-based fishing technique.

BRIEF SUMMARY OF THE INVENTION

One embodiment of the present invention relates to a fishing reel comprised of a bobbin and a bracket rigidly attached to the bobbin. The bobbin comprises first and second ends and an elongate body extending between the first and second ends. At each end of the bobbin, there is a pair of protrusions and a gathering region between the protrusions. The bracket comprises at least one support member configured to support the bobbin relative a fishing rod. The bracket further comprises a pair of flanges configured to be received under a hood on a fishing rod.

Another embodiment of the invention relates to a fishing reel comprising an elongate bobbin and a bracket extending from the bobbin. The bobbin has first and second ends and a bobbin length. The bobbin length is defined by the distance between the first and second ends. The bobbin is configured to receive fishing line. The bracket has a pair of flanges oriented oppositely relative to each other. Each flange has an outermost edge point and is configured to be received under a hood on a fishing rod. The bracket has a bracket length defined by the distance between the outermost edge points of the flanges. The bobbin length is at least twice as great as the bracket length.

Yet another embodiment of the invention relates to a fishing reel comprising an elongate member and a mounting member extending from the elongate member. The elongate member has first and second ends, and each end has one or more protrusions. The elongate member is configured to receive fishing line. The mounting member has tabs configured to be held under hoods of a fishing rod. The fishing reel is substantially free of moving parts.

The foregoing brief description should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

BRIEF DESCRIPTION OF DRAWINGS

While the specification concludes with claims which particularly point out and distinctly claim the invention, it is believed the present invention will be better understood from the following description taken in conjunction with the accompanying drawings, in which like reference numerals identify the same elements. The drawing and detailed description which follow are intended to be merely illustrative and are not intended to limit the scope of the invention as set forth in the appended claims.

DETAILED DESCRIPTION

Figure 1:
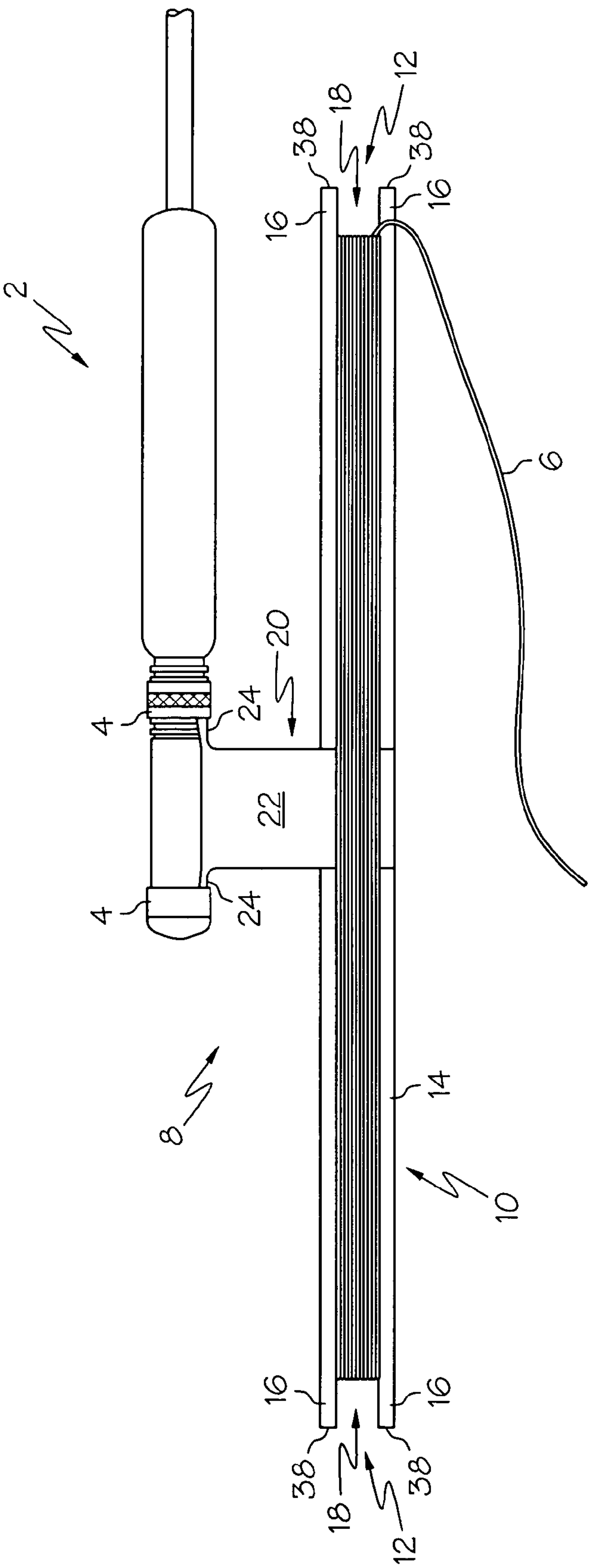
FIG. 1 depicts a side view of an exemplary fishing reel mounted to a fishing rod.
Figure 2:
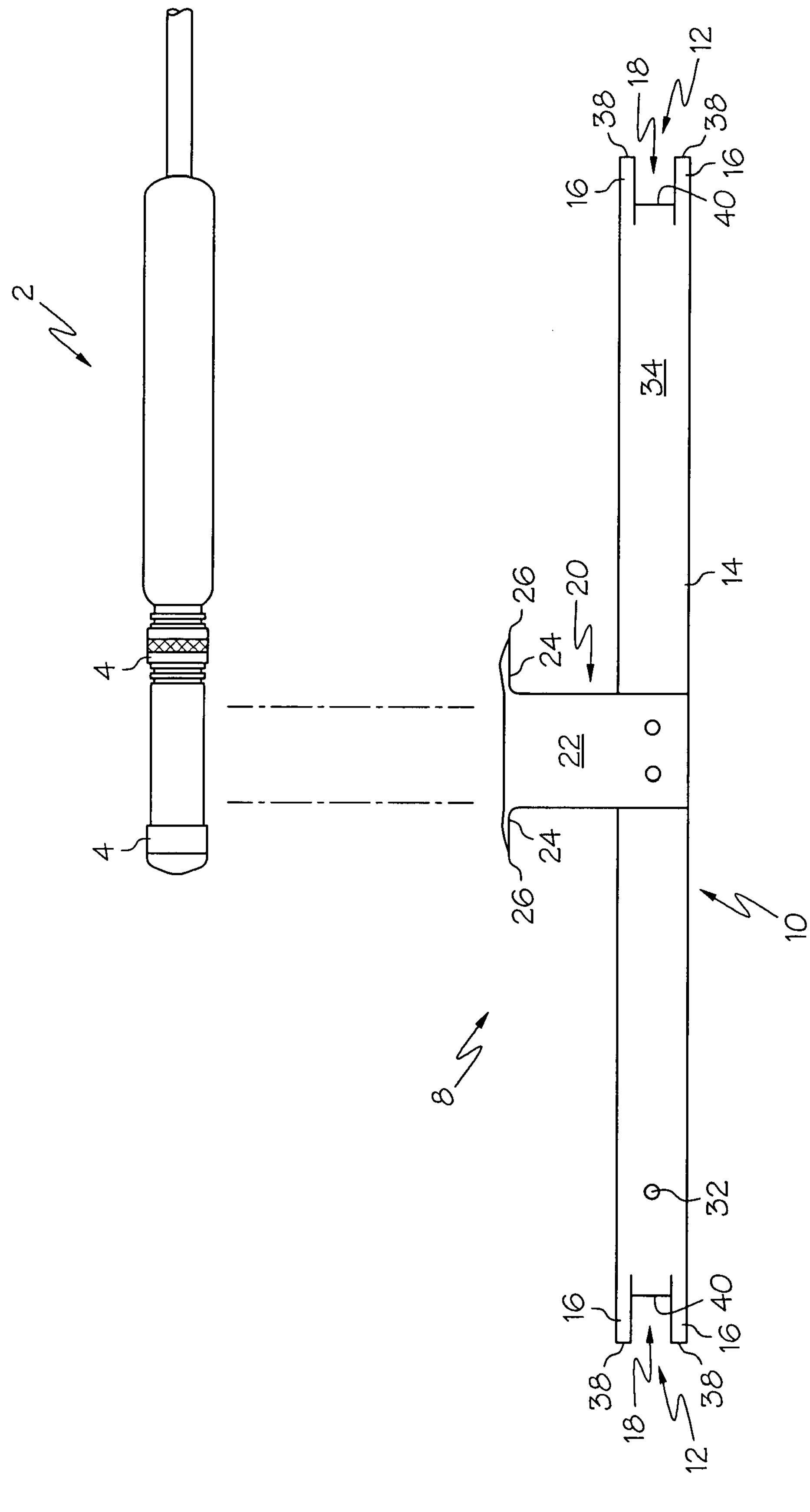
FIG. 2 depicts an exploded side view of the fishing reel of FIG. 1, without fishing line.
Figure 3:
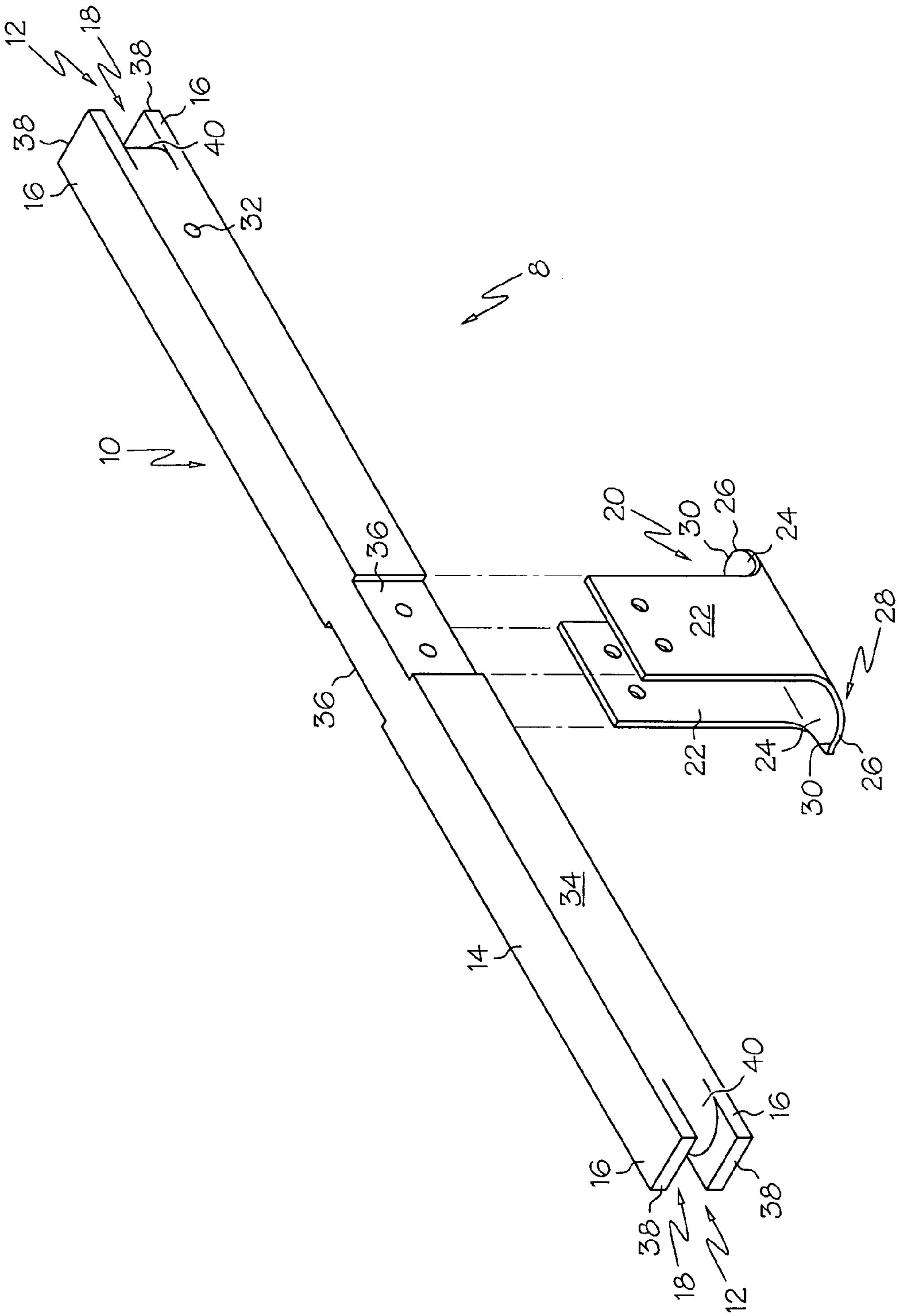
FIG. 3 depicts an exploded perspective view of the fishing reel of FIG. 2.
Figure 4:
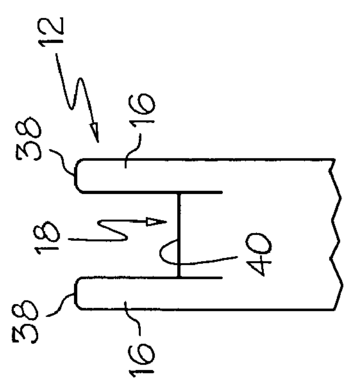
FIG. 4 depicts a side view of an end of the fishing reel of FIG. 2.

FIG. 1 illustrates a fishing reel (8) mounted to a standard fly fishing rod (2). While a fly fishing rod (2) is depicted in the present example, it will be appreciated that the fishing reel (8) may be mounted to any standard fishing rod. As shown here, the fishing reel (8) is mounted to the fishing rod (2) under the ferrules or hoods (4) of the rod (2). As shown in FIGS. 1, 2, and 3, the fishing reel (8) comprises an elongate member or bobbin (10) and a mounting member or bracket (20) for mounting the reel (8) to a fishing rod (2). As shown here, the bracket (20) is rigidly attached to the bobbin (10).

The bobbin (10) has two ends (12) and an elongate body (14) extending between the ends (12). A pair of protrusions (16) are at each end. A gathering region (18) exists between each pair of protrusions (16). The bobbin (10) is configured to wrappingly receive fishing line (6) about the body (14) and between each pair of protrusions (16). In use, a user may manually wrap fishing line (6) about the bobbin (10), such that the bobbin (10) holds the line (6) like the bobbin (10) shown in FIG. 1.

The bobbin (10) in the present example is depicted as being generally rectangular and having two side surfaces (34). However, it will be appreciated that the bobbin (10) may have a variety of other geometries. By way of example only, the bobbin (10) may be generally cylindraceous, square, triangular, or any other geometric configuration. While the dimensions may vary substantially, in the present example the bobbin (10) is rectangular with a width of about 1½" and a thickness of about 1". As another non-limiting example, the bobbin (10) may have a width and thickness of ½". The bobbin (10) may be made from a variety of materials, including without limitation wood, aluminum, titanium, steel, KEVLAR®, graphite, plastic, and the like, or combinations thereof.

As shown in FIG. 3, each gathering region (18) may comprise a smooth, rounded gathering surface (40) that is contiguous to both side surfaces (34). Such rounding may reduce wear on the line (6). Other suitable configurations of the gathering regions (18), including configurations of each gathering surface (40), will be apparent to those of ordinary skill in the art.

Figure 5:
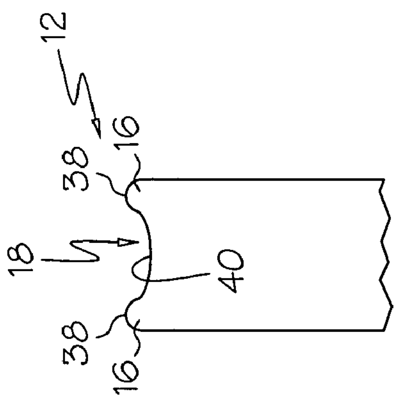
FIG. 5 depicts a side view of an alternative end of a fishing reel.
Figure 6:
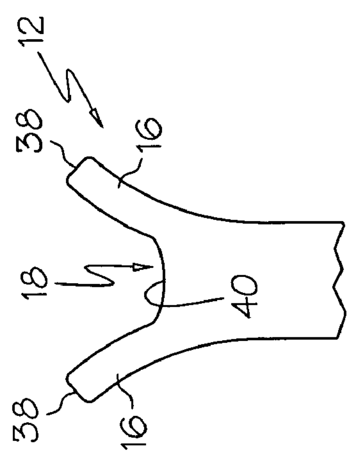
FIG. 6 depicts a side view of an alternative end of a fishing reel.
Figure 7:
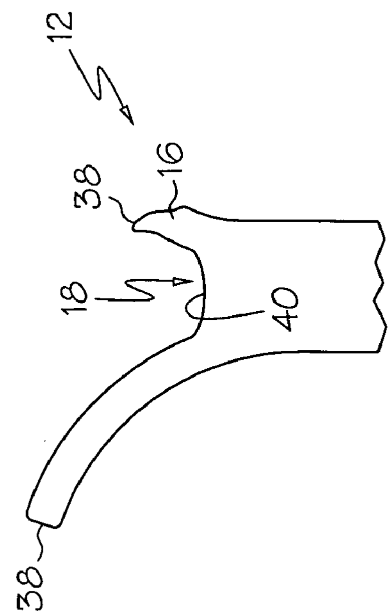
FIG. 7 depicts a side view of an alternative end of a fishing reel.

As shown in FIGS. 1 through 4, the protrusions (16) comprising a pair may be approximately equally sized and parallel to each other. FIGS. 5 through 7 show a few possible, but non-exhaustive, alternative configurations of protrusions (16). As shown in FIG. 5, the protrusions (16) need not extend a substantial distance from the body (14) of the bobbin (10). As shown in FIG. 6, the protrusions (16) may be approximately equally sized and splayed. It will be appreciated that having one or both of the protrusions (16) splayed may help to guide the line (6) to the gathering region (18) as the line is being wrapped about the bobbin (10).

It will be understood that one protrusion (16) of a pair may be sized or configured differently from the other protrusion (16) of the same pair. By way of example, the embodiment depicted in FIG. 7 has protrusions (16) that are not sized equally. FIG. 7 also shows how one protrusion (16) of a pair may be flared differently than the other protrusion (16) of the pair. Where one protrusion (16) of a pair is longer or more flared than the other protrusion (16) of the same pair, the longer or more flared protrusion (16) may be positioned closer to the rod (2) than the other protrusion (16) of the pair. It will be appreciated that such a configuration may reduce the likelihood of line (6) missing the bobbin (10) during wrapping of the line (6), such that the likelihood of the line (6) being damaged by the bracket (20) will be reduced.

Alternatively, the bobbin (10) may only have one protrusion (16) at an end (12). Still other suitable protrusion configurations will be apparent to those of ordinary skill in the art.

The bobbin (10) may have an opening (32) configured to receive a free end of fishing line (6), providing a means for securing the line (6) to the bobbin (10) after the line (6) has been passed through the opening (32) and tied. This opening (32) may be formed in the body (14) of the bobbin (10). Optionally, a spring hinged catch may be used to hold the line (6) within the opening (32). Alternatively, the opening (32) may be provided by an eyelet attached to the bobbin (10). Other suitable configurations for an opening (32) will be apparent to those of ordinary skill in the art.

The bracket (20) comprises at least one support member (22) and a pair of flanges (24). In the present example, the bracket (20) has two support members (22). However, it will be appreciated that any suitable number of support members (22) may be used. The support members (22) in the present example are configured to support the bobbin (10) relative to the fishing rod (2). Each flange (24) is configured to be received under a hood (4) on the fishing rod (2). In the present example, the flanges (24) are tabs. It will be appreciated, however, that the flanges (24) may be of any other suitable configuration.

The flanges (24) are oriented oppositely relative to each other. Each flange (24) has an outer edge (26) and a bottom surface (28). Along the outer edge (26) of each flange (24) lies an outermost edge point (30). The bracket (20) has a bracket length defined by the distance between the outermost edge points (30) of the flanges (24). Preferably, this bracket length will permit the bracket (20) to be attached to a standard fishing rod (2) in the same manner as a standard fishing reel. Typically, such attachment is provided by engagement of the flanges (24) under the hoods (4) on the fishing rod (2). By way of example only, the bracket length may be between approximately 1" and 6". In the present example, the bracket length is approximately 2½".

As shown in FIG. 3, the outer edges (26) of the flanges (24) may be rounded. Alternatively, the outer edges (26) of the flanges (24) may have any other suitable configuration. As also shown in FIG. 3, the bottom surface (28) of each flange (24) has a concave curvature. Such curvature may compliment the curvature of the rod (2) under the hoods (4). In other words, the radius of curvature of the concave bottom surface (28) of each flange (24) may be approximately equal to the radius of curvature of the rod (2) underneath the hoods. Such curvature may provide a snug fit between the bracket (20) and the rod (2), preventing angular movement of the bracket (20) about the rod (2). Of course, the bottom surface (28) of each flange (24) may have any other suitable curvature or no curvature at all.

In the present example, the bobbin (10) has recessed portions (36) in its side surfaces (34). These recessed portions (36) provide a region for engagement of the bobbin (10) with the bracket (20). When the bobbin (10) has recessed portions (36) in its side surfaces (34), each recessed portion (36) will preferably be recessed to a distance relative to its respective side surface (34) that is approximately equal to the thickness of the corresponding support member (22). In this configuration, the exposed surface of the support member (22) will be substantially flush or recessed, thereby reducing the potential for wear on the fishing line (6). Of course, one or both of the recessed portions (36) may be recessed to a greater or lesser distance. Alternatively, one or both of the recessed portions (36) may be eliminated altogether. In fact, to the extent that the bobbin (10) has side surfaces (34), the bracket (20) need not be attached to the bobbin (10) at either of the side surfaces (34).

The bracket (20) may be rigidly connected to the bobbin (10) by any suitable fastening means such as, by way of example only, pins, rivets, screws, adhesives, epoxy, and the like. Alternatively, the bracket (20) and the bobbin (10) may be configured to securably fit together without the need for an additional fastening means. For example, the bracket (20) and the bobbin (10) may be held together by a self-securing joint. It will also be appreciated that the bracket (20) and the bobbin (10) may be integrally formed. For example, the bracket (20) and the bobbin (10) may comprise the same homogenous continuum of material. Thus, the phrase "rigidly connected," as that term is used herein, should not be read as requiring the bobbin (10) and bracket (20) to be initially formed as separate parts.

The bobbin (10) has a length defined by the distance between its two ends (12). Preferably, this bobbin length will be at least twice as great as the bracket length. By way of example only, the bobbin length may be about 15", 16", or 20". Of course, the bobbin (10) may be of any other suitable length.

It will be appreciated that the bracket (20) may be made of be made of any suitable material, such as, by way of example only, wood, plastic, metal, or combinations thereof. By way of example only, where the bracket (20) is made of metal, the bracket (20) may be formed from a unitary sheet of 14 to 21 gauge stainless steel.

Thus, in the present example, the fishing reel (8) is substantially free of moving parts. The phrase "substantially free of moving parts" should only be read to imply that the fishing reel (8) lacks parts that permit rotation of the bobbin (10) relative to the bracket (20), such as an axle or the like. The phrase "moving parts" should not be read to imply that the fishing reel (8) has no moving parts whatsoever. For example, in an alternate embodiment, the bobbin (10) has a moveable clasp or other means for securing the line (6) to the bobbin (10) to prevent unintentional unwrapping of the line (6) from the bobbin (10).

In use, a user may mount the fishing reel (8) to any standard fishing rod (2) or remove the fishing reel (8) from a standard fishing rod (2) in the same manner as the user would do the same with a conventional reel. As the bobbin (10) of the present example will not rotate relative to the bracket (20) when the bracket (20) is attached to the bobbin (10), the user may manually wrap fishing line (6) around the bobbin (10), between the protrusions (16) at each end (12). Similarly, the user may unwrap the fishing line (6) from the bobbin (10) manually.

Having shown and described various embodiments of the present invention, further adaptations of the methods and systems described herein can be accomplished by appropriate modifications by one of ordinary skill in the art without departing from the scope of the present invention. Several of such potential alternatives, modifications, and variations have been mentioned, and others will be apparent to those skilled in the art in light of the foregoing teachings. For instance, while the present invention offers many benefits and advantages in fly fishing, the invention could be used with other rod-based fishing techniques. Accordingly, the invention is intended to embrace all such alternatives, modifications and variations as may fall within the spirit and scope of the appended claims and is understood not to be limited to the details of structure and operation shown and described in the specification and drawings.

What is claimed is:

1. A fishing reel, comprising:

(a) a bobbin comprising
  - (i) first and second ends,
  - (ii) an elongate body extending between the first and second ends,
  - (iii) a pair of protrusions at each end wherein at least one pair of protrusions is splayed, and
  - (iv) a gathering region at each end, each gathering region being between the protrusions at each respective end, the bobbin being configured to wrappingly receive line about the body and between each pair of protrusions; and (b) a bracket rigidly attached to the bobbin, the bracket comprising
  - (i) at least one support member, the at least one support member being configured to support the bobbin relative a fishing rod, and
  - (ii) a pair of flanges, each flange being configured to be received under a hood on a fishing rod.

2. The reel of claim 1, wherein the protrusions in a pair are parallel.

3. The reel of claim 1, wherein the protrusions in a pair are different sizes.

4. The reel of claim 1, further comprising a means for securing the line to the bobbin.

5. The reel of claim 4, wherein the means comprises an opening in the body.

6. The reel of claim 1, wherein the bobbin is formed from a homogenous continuum of material.

7. The reel of claim 1, wherein the elongate body further comprises two side surfaces.

8. The reel of claim 7, wherein each side surface has at least one recess.

9. The reel of claim 7, wherein each gathering region comprises a rounded surface that is contiguous to both side surfaces.

10. The reel of claim 1, wherein the bracket is formed from a unitary sheet of metal.

11. The reel of claim 1, wherein the flanges are tabs.

12. The reel of claim 1, wherein each flange has a round edge.

13. The reel of claim 1, wherein each flange has a bottom surface with a concave curvature.

14. A fishing reel, comprising:

(a) a slender elongate bobbin having first and second ends and a bobbin length, the bobbin length being defined by the distance between the first and second ends wherein the bobbin length is between about 15 inches and 20 inches, inclusive, wherein the bobbin has a pair of protrusions at each end, the bobbin being configured to receive fishing line between the protrusions of each said pair of protrusions in a gathering region defined by the protrusions of each pair of protrusions at each end, wherein the gathering region has a smooth, rounded gathering surface, and wherein the bobbin is rectangular in shape and wherein the width of the bobbin is between about ½ inch to 1½ inches and wherein the thickness of the bobbin is between about ½ inch to 1 inch; and (b) a bracket extending from the bobbin, the bracket having a pair of flanges wherein the flancies comprise tabs, the flanges being oriented oppositely relative to each other, each flange having an outermost edge point, each flange being configured to be received under a hood on a fishing rod, wherein the flanges have a bottom surface of concave curvature, the bracket having a bracket length defined by the distance between the outermost edge points of the flanges wherein the bracket length is between about 1 inch and 6 inches;

and wherein the fishing reel is substantially free of moving parts.

15. A fishing reel, comprising:

(a) an elongate member having first and second ends, each end having one or more protrusions wherein at least one of said one or more protrusions is flared, the elongate member being configured to receive fishing line; and (b) a mounting member extending from the elongate member, the mounting member having tabs configured to be held under hoods of a fishing rod;

wherein the fishing reel is substantially free of moving parts.

* * * * *

UNITED STATES PATENT AND TRADEMARK OFFICE
CERTIFICATE OF CORRECTION

PATENT NO. : 7,011,262 B2
APPLICATION NO. : 10/817075
DATED : March 14, 2006
INVENTOR(S) : Patterson, David Michael It is certified that error appears in the above-identified patent and that said Letters Patent is hereby corrected as shown below:

Column 7, Claim 14, line 25 "...wherein the flancies…", please delete and replace with, "...wherein the flanges…".

Signed and Sealed this

Twenty-second Day of August, 2006

JON W. DUDAS
*Director of the United States Patent and Trademark Office*